United States Patent
Kelly et al.

(10) Patent No.: US 6,804,199 B1
(45) Date of Patent: Oct. 12, 2004

(54) COMMUNICATIONS NETWORK SYSTEM AND METHOD FOR ROUTING BASED ON DISJOINT PAIRS OF PATHS

(75) Inventors: Timothy Gene Kelly, Shawnee, KS (US); Nina Anne Taft, San Francisco, CA (US); William Lee Edwards, Carbondale, CO (US); Richard G. Ogier, Sunnyvale, CA (US); Bhargav Bellur, Fremeont, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 10/357,728

(22) Filed: Feb. 4, 2003

Related U.S. Application Data

(63) Continuation of application No. 09/209,121, filed on Dec. 10, 1998, now Pat. No. 6,542,469.

(51) Int. Cl.[7] .................. G01R 31/08; H04L 12/66; H04J 3/16

(52) U.S. Cl. .................. 370/238; 370/356; 370/468

(58) Field of Search .................. 370/252, 238, 370/255, 351, 356, 401, 468, 477, 396; 709/105, 226, 238

(56) References Cited

U.S. PATENT DOCUMENTS

| | | | | |
|---|---|---|---|---|
| 5,629,930 A | * | 5/1997 | Beshai et al. | 370/396 |
| 5,675,578 A | * | 10/1997 | Gruber et al. | 370/248 |
| 5,754,543 A | * | 5/1998 | Seid | 370/351 |
| 6,370,119 B1 | * | 4/2002 | Basso et al. | 370/252 |

\* cited by examiner

*Primary Examiner*—Duc Ho

(57) ABSTRACT

Methods for determining at least two pre-computed paths to a destination in a communications network are provided. The two paths are maximally disjoint. Maximally disjoint paths are paths where the number of links or nodes common to the two paths is minimized. This minimization is given a priority over other path considerations, such as bandwidth or cost metrics. By pre-computing a maximally disjoint pair of paths, the probability that an inoperable link or node is in both paths is minimized. The probability that the inoperable link or node blocks a transfer of data is minimized. Additionally, a pair of maximally disjoint paths is determined even if absolutely disjoint paths are not possible. The communications network may include at least four nodes, and maximally disjoint pairs of paths are pre-computed from each node to each other node. A third path from each node to each other node may also be computed as a function of bandwidth or a cost metric. Therefore, the advantages of the maximally disjoint pair of paths are provided as discussed above and a path associated with a higher bandwidth or lower cost is provided to more likely satisfy the user requirements of a data transfer.

38 Claims, 5 Drawing Sheets

Phase 1

Phase 2

Phase 3

Phase 4

COMMUNICATIONS NETWORK SYSTEM AND METHOD FOR ROUTING BASED ON DISJOINT PAIRS OF PATHS

RELATED APPLICATIONS

This application is a continuation of U.S. patent application Ser. No. 09/209,121, filed Dec. 10, 1998, entitled "Communications Network System and Method For Routing Based on Disjoint Pairs of Paths," now U.S. Pat. No. 6,542,469 which is hereby incorporated by reference.

FEDERALLY SPONSORED RESEARCH OR DEVELOPMENT

[Not Applicable]

MICROFICHE APPENDIX

[Not Applicable]

BACKGROUND OF THE INVENTION

1. Field of the Invention

This invention generally relates to routing in communication or computer networks. In particular, the invention relates to determining pre-computed paths for transmitting data, including voice and video data, through a network.

2. Description of the Prior Art

Communication networks transfer data from a source to a destination. The data is routed through various nodes and links in the network. The nodes and links may be organized in a flat network hierarchy (i.e., a single peer group) or multiple peer-group levels. Communications networks may include switched virtual circuits (SVCs) for routing a path separately for each request to transfer data.

User calls or requests for transferring data are provided to the network. A path satisfying constraints imposed by a user requirement is determined, such as satisfying bandwidth or delay requirements. SVCs are set-up after routing algorithms determine paths with sufficient resources to meet the user's requirements.

The data may be transferred using an asynchronous transfer mode (ATM) format. The ATM format defines a standard for signalling and routing, the Private-Network-to-Network-Interface (PNNI) standard. The PNNI standard defines two categories of ATM protocols, one for signalling and one for routing. The standard specifies a framework for source-based link-state routing that includes: (1) a mechanism for establishing a hierarchy among nodes; (2) the specification of the topology information that is available for path computation and selection, and the protocol by which this information is disseminated; and (3) a format in which paths must be specified for PNNI signalling. The PNNI standard does not include a particular routing algorithm or way of using the framework for determining a path.

Two types of algorithms may be used to support SVC routing in an ATM format. A first type of algorithm is used to determine pre-computed paths. The algorithm for pre-computing paths is run at each node, and pre-computed paths are found from that node to every destination in the network. The second type of algorithm is used to calculate a path on-demand if none of the pre-computed paths can accept the call. Both of these types of routing algorithms find paths based on the PNNI link-state information maintained in a topology database at each node. This information includes the recent status of each network link and node, such as the bandwidth, delay, jitter, cell loss ratios and other topology information.

For efficient routing using pre-computed paths, multiple pre-computed paths to each destination may be determined. One approach is to compute a pair of completely disjoint paths to each destination. See the algorithm of Suurballe and Tarjan, "A Quick Method for Finding Shortest Pairs of Disjoint Paths," Networks, Vol. 14, pp. 325–336 (1984). This algorithm computes a pair of disjoint paths such that the total cost of the two paths from a given source to a destination node is minimized. Any additive cost metric can be used, such as delay, jitter or hop count. This algorithm has a complexity proportional to O(M log N), where N is the number of nodes and M is the number of links. However, this algorithm does not yield any output (ie., a path) when no absolutely disjoint paths to the node exist nor can it yield any output when two paths to the destination node share any common resources.

In another known pre-computation algorithm, a single path with maximum available bandwidth that has the minimum delay among all maximum-bandwidth paths is computed. However, this algorithm only computes a single path for each source-destination pair. (i.e., it does not compute an alternate path).

Another algorithm computes a minimum cost path, then assigns large costs to the links in the computed path, then assigns large costs to the links in the computed path, and then computes a second minimum cost path that is therefore maximally disjoint from the first path. There are two main drawbacks of this method. One is that, because of the restriction that the first computed path belong to the pair of computed paths, the computed pair may not be maximally disjoint (i.e., the two paths may share more than the minimum number of links or nodes). The second drawback is that the method requires a large running time, since to compute paths from a single source to all destinations requires N executions of a shortest-path algorithm, which requires O (NM log N) running time assuming Dijkstra's algorithm is used.

Another algorithm computes k shortest paths having distinct initial links from the source node to each destination node, such that the second node of each path does not belong to any of the other k−1 paths. However, this algorithm does not guarantee the computation of an alternate path that avoids an arbitrary blocking link or node.

Several methods for alternate routing have been developed for fully connected networks in which one path is a direct one-hop path and the alternate path is a two-hop path. However, these methods are not applicable to general topology networks nor to paths with multiple per-path constraints.

These and other disadvantages of previous algorithms may be overcome by the invention and preferred embodiment discussed below.

SUMMARY OF THE INVENTION

The invention relates to methods for determining at least two pre-computed paths to each selected destination in a communications network. The two paths are maximally disjoint. Maximally disjoint paths are paths where the number of links or nodes common to the two paths is minimized. This minimization is given a priority over other path considerations, such as bandwidth or cost metrics. By pre-computing a maximally disjoint pair of paths, the probability that an inoperable or poor-quality link or node is in both paths is minimized. The probability that the inoperable link or node blocks a transfer of data is minimized. This approach increases the likelihood that calls are accepted into the network. Additionally, a pair of maximally disjoint paths is determined even if absolutely disjoint paths are not possible.

The communications network may include at least four nodes, and maximally disjoint pairs of paths are precomputed from one or more nodes to one or more other nodes. A third path from each node to each other node may also be computed as a function of bandwidth or a cost metric, such as the same metric used to compute the maximally disjoint paths. Therefore, the advantages of the maximally disjoint pair of paths are provided as discussed above and a path associated with a higher bandwidth or lower cost is provided to more likely satisfy the user requirements of a data transfer.

The maximally disjoint paths may be determined using lexicographic minimization. Lexicographic minimization allows other secondary objectives to be optimized, such as bandwidth. By determining maximally disjoint paths that maximize bandwidth, disjoint paths most likely to satisfy bandwidth requirements associated with a data transfer are determined.

The maximally disjoint paths may be determined with a complexity proportional to the number of links multiplied by the log of the number of nodes, assuming one source and multiple destinations. Therefore, maximally disjoint paths may be quickly determined for more efficient implementation on the network than previous methods. By representing the maximally disjoint paths with a compact representation, the memory required for storing the paths is minimized.

In a particular first aspect of the invention, a method for determining a plurality of paths in a network is provided. A source node and a destination node in the network are selected. Two maximally disjoint paths from the source node to each selected destination node are determined. The two maximally disjoint paths can have one or more common links.

In a second aspect of the invention, a method for determining a plurality of paths in a network is provided. The network includes at least four nodes. A source node and a destination node in the network are selected. At least first and second maximally disjoint paths from the source node to the destination node are determined as a function of maximum bandwidth.

DETAILED DESCRIPTION OF PREFERRED EMBODIMENTS

In the preferred embodiments of the present invention discussed below, two maximally disjoint paths are determined. A path is a-route for transferring data from one location to another location through a network. Maximally disjoint paths are paths where the number of links or nodes common to the two paths is minimized. Two maximally disjoint paths may include a common link or node, such as where only one link transfers data from the source or only one node connects different portions of the network. By determining a maximally disjoint pair of paths, the probability that an inoperable or poor-quality link or node is in both paths is minimized. The probability that the inoperable link or node blocks a transfer of data is minimized even if absolutely disjoint paths are unavailable.

I. General

Figure 1A:
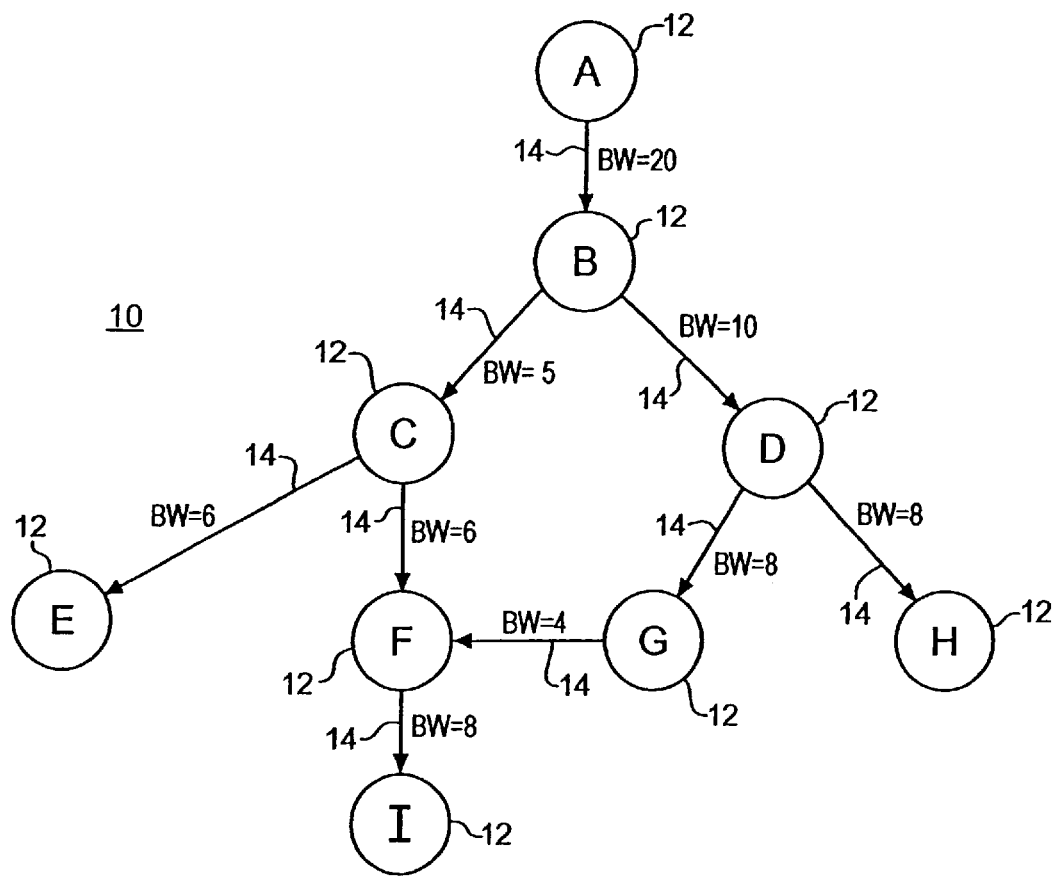
FIG. 1A is a schematic representation of one embodiment of a communications network for determining maximally disjoint paths in accordance with the present invention.

Referring to FIG. 1A, a schematic representation of one embodiment of a communications network for determining maximally disjoint paths in accordance with the present invention is shown generally at 10. Network 10 includes a plurality of nodes 12 and links 14. As shown, links 14 are directional, as represented by the arrows. Links 14 may also be bidirectional. Each node 12 represents a switch or other processor for transferring or processing data. Each link 14 represents a communications connection for transferring data. Network 10 is representative. Other networks with different topologies, including more or fewer links 14 and nodes 12 may be used. Furthermore, networks with single-group or multiple-group peer structures may be used.

In one embodiment, network 10 is an ATM network that supports SVC connections. Network 10 operates pursuant to the ATM standard. In another embodiment, network 10 operates as a TCP\IP network. Other switching networks and data formats may be used.

As used herein, each node 12 is designated by a letter, such as node A. Each link 14 is designated by the nodes 12 bounding the link 14, such as link AB between nodes A and B assuming that there are no parallel links between any two nodes.

Figure 1B:
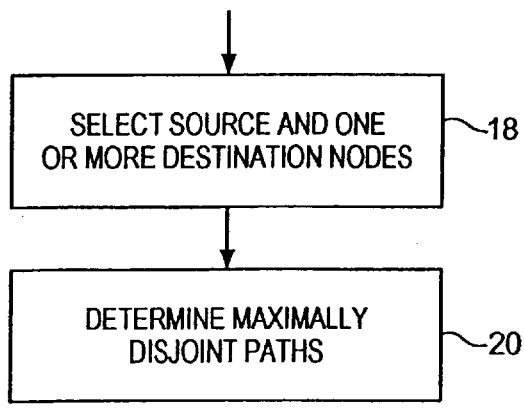
FIG. 1B is a flow chart diagram of one embodiment for determining maximally disjoint paths in the network of FIG. 1A in accordance with the present invention.

Referring to FIG. 1B, a flow chart diagram of one embodiment for determining maximally disjoint paths in the network of FIG. 1A in accordance with the present invention is shown. In step 18, a source node and one or more destination nodes are selected. For example, node A is selected as the source node and node I is selected as the destination node.

In step 20, the maximally disjoint paths are determined. In the example above, both maximally disjoint paths start at source node A and end at source node I. One maximally disjoint path passes through nodes B, C, and F. To minimize the common links, the other maximally disjoint path passes through nodes B, D, G and F. Since only link AB connects node A to the rest of network 10 and only link FI connects node I to the rest of the network, links AB and FI are common to the maximally disjoint pair of paths. However, the number of common links 14 is minimized. More than two maximally disjoint paths may be determined.

In a preferred embodiment, a single source and multiple destination nodes are selected. A pair of maximally disjoint paths is determined for each selected destination node. In this embodiment, the algorithm for determining the paths is processed at each node 12. Each node 12 determines the paths associated with that node 12 as the source node. For example, node A is selected as the source node. A pair of maximally disjoint paths is determined for every other node 12 in network 10. Node A determines these paths. Paths can be computed for multiple source nodes by executing the algorithm separately for each source.

In a preferred embodiment, the plurality of maximally disjoint pairs of paths are pre-computed (i.e., determined prior to receiving a request for a connection or transfer of data). Pre-computation reduces the path set-up time. By storing multiple pre-computed paths, multiple paths may be examined to satisfy a requested transfer. Furthermore, any selected path may fail because other new transfers have been routed on some of the path links, due to a link or node failure, or other factors.

For a request for transferring data received at a source node, the source node compares the user constraints associated with the data to the level of the network parameters associated with the pre-computed paths. Assuming one of the pre-computed paths is capable of transmitting the data, the source node provides the selected pre-computed path to the PNNI signalling algorithm. The path is defined by designated transit lists (DTLs). One DTL is needed for each peer group level. The DTL specifies the nodes 12 along the path.

Alternate paths may be provided in response to a crank-back. When a call set-up is blocked by a node 12 or link 14, a RELEASE message is sent to the source node. The source node selects an alternate path. The release message specifies the node 12 or link 14 that blocked the call set-up, so that the alternate path may be selected that avoids nodes 12 and links 14 that previously blocked the call. By providing maximally disjoint paths, the probability of finding an alternate path that does not block the call is increased.

II. Number and Type of Maximally Disjoint Path Pairs

To further reduce the blocking rate, a plurality of pairs of maximally disjoint pairs of paths may be determined for each source and destination node combination. Each pair of maximally disjoint paths is determined as a function of different network parameters, such as bandwidth and cost metrics. For example, one pair of maximally disjoint paths is determined as a function of bandwidth, such as selecting one of two potential links of a path as a function of bandwidth. Another pair of maximally disjoint paths is determined as a function of a cost metric.

In the ATM network of the preferred embodiment, cost metrics and bandwidth data (i.e., network parameters) associated with each link 14 are stored at each node 12. Cost metrics include delay, jitter, cell loss ratios, hop count and an administrative weight. Other cost metrics may be used. A pair of maximally disjoint paths may be determined for each of the cost metrics and some combinations of cost metrics. Delay, jitter, and administrative weight parameters are additive metrics. Additive metrics may be combined to generate a single cost metric. The cell loss ratios may be approximately additive when less than 0.001, so cell loss ratio may be used as an additive metric.

In one preferred embodiment, three different network parameters are used to determine three pairs of maximally disjoint paths to each selected destination. Limiting the number of pre-computed maximally disjoint pairs may limit the amount of storage used and the amount of time to determine paths. Since the number of nodes 12 may be large (i.e., in the hundreds), the total number of pre-computed paths does not exceed 15 in one preferred embodiment, but more pre-computed paths may be determined.

In addition to the number of pairs of maximally disjoint paths, the network parameters, if any, for determining each maximally disjoint pair are selected. For example, maximally disjoint paths are computed as a function of maximum bandwidth as a first consideration and minimum delay as a second consideration; maximally disjoint paths are computed as a function of minimum delay; and maximally disjoint paths are computed as a function of a mixed network parameter that combines bandwidth and delay. Other network parameters and number of paths may be used.

The three pairs of maximally disjoint paths comprise a single group of paths that may be considered for all requests to transfer data. Each request may have a large number of potential alternate paths, reducing the call blocking rate and call set-up time. If network 10 includes nodes 12 or links 14 dedicated to a network service category, maximally disjoint paths may be determined separately for those nodes 12 or links 14.

In alternative embodiments, the number of maximally disjoint paths is further grouped according to quality of service classes of the network parameters. For a given network paramter, maximally disjoint paths are determined for each of different levels of the parameter. For example, one pair of maximally disjoint paths is determined as a function of bandwidths over 100 Mbits per second, and a second pair of maximally disjoint paths is determined as a function of bandwidths over 50 Mbytes per second.

In other alternative embodiments, the pairs of maximally disjoint paths are determined as a function of network service categories for the entire network 10. Service categories represent the types of data transferred, such as variable, constant, unassigned and available bit rate data The network parameter used as a secondary function for determining maximally disjoint pairs is a function of the service category. For example, a request to transfer available bit rate data is associated with maximally disjoint paths pre-computed as a function of a cell loss ratio.

In yet another preferred embodiment, a primary path is determined for each pair of maximally disjoint paths. The primary path is determined as a function of the network parameter associated with the maximally disjoint paths. The primary path is determined without consideration to the number of common links 14 or nodes 12 to the two maximally disjoint paths. For example, a first set of paths includes a pair of maximally disjoint paths determined as a function of bandwidth with cell loss as a second consideration and a primary path determined as an optimal function of bandwidth with cell loss as a second consideration. For the primary path, the network parameter is minimized (i.e. optimized).

III. Algorithm for Determining Maximally Disjoint Paths

A. General

In one embodiment, the algorithm for pre-computing maximally disjoint paths assumes that a cost $c(i, j)$ and a bandwidth $b(i, j)$ is assigned to each link 14 $(i, j)$. The cost is any one of the additive network parameters (e.g., delay, jitter, AW, hop count, cell loss ratio or a linear combination thereof). As discussed above, the preferred algorithm is responsive to three objectives: minimizing cost, maximizing bandwidth and minimizing cost as a secondary consideration, and a tradeoff between minimizing cost and maximizing bandwidth. In one preferred embodiment, the cost is delay. The three objectives correspond to the three sets of maximally disjoint paths determined for each destination node from each source node. Different, fewer or additional objectives may be used.

For the first objective, cost, maximally disjoint pair of paths of minimum total cost are determined from a source node to each destination node. To account primarily for the number of common links 14 and secondarily for the cost, lexicographic minimization is used. Lexicographic minimization is represented as:

$$(g(P1, P2), c(P1, P2)) \quad \text{Eq. 1}$$

where $g(P1, P2)$ denotes the number of links 14 common to the two paths (P1 and P2) and $c(P1, P2)$ denotes the total cost of the two paths summed over all links 14 in the paths.

Lexicographic minimization requires minimizing a primary objective, such as the number of common links 14. If two possibilities of equal minimization of the number of common links 14 exist for one path, then the possibility with the best secondary objective, such as lowest cost, is selected. Lexicographic minimization is mathematically defined as:

Given two pairs $(g, c)$ and $(g', c)$, we say that $(g, c)$ is lexicographically less than or equal to $(g', c')$ {i.e., $(g, c) \square (g', c')$} if either (1) $g<g'$, or (2) $g=g'$ and $c \square c'$.

Given a triple $(g, b, c)$, we say that $(g, b, c) \square (g', b', c')$ if (1) $g<g'$, or (2) $g=g'$ and $(b, c) \square (b', c')$.

For the first objective, $g(P1, P2)$ is minimized. Minimizing the number of common links generates maximally disjoint paths. Among all possible maximally disjoint pairs of paths, $c(P1, P2)$ is minimized.

For the second objective, a maximally disjoint pair of paths is determined as a function of the maximum bandwidth. For multiple possibilities with an equal number of common links 14 and the same bandwidth, the total cost of the possibilities is minimized over all possibilities having the compact representation described below. Mathematically, this lexicographic minimization is represented as:

$$(g(P1, P2), 1/b(P1, P2), c(P1, P2)) \quad \text{Eq. 2}$$

where $b(P1, P2)$ denotes the minimum bandwidth of the two paths. The bandwidth of a path is the smallest bandwidth of all links in the path.

For the third objective, a trade-off between minimizing the cost and maximizing the bandwidth is used for determining the maximally disjoint pair of paths. A threshold is applied to one of the network parameters. For example, a bandwidth threshold, $\Theta$, is applied to each pair of maximally disjoint paths. For each destination, the algorithm computes a maximally disjoint pair of paths having bandwidth at least $\Theta$ and minimum cost, when such a pair exists. If such a pair does not exist, the algorithm finds a maximally disjoint pair of paths having maximum bandwidth. Mathematically, this lexicographic minimization is represented as:

$$(g(P1, P2), 1/\min\{b(P1, P2), \Theta\}, c(P1, P2)) \quad \text{Eq. 3}$$

In alternative embodiments, the threshold corresponds to other network parameters, such as delay.

In addition to maximally disjoint pairs of paths, a primary path to each destination may be computed for each objective. The primary paths for the three objectives of the algorithm optimally minimize the three objectives $c(P)$, $(1/b(P), c(P))$, and $(1/\min\{b(P), \Theta\}, c(P))$, respectively, where $c(P)$ and $b(P)$ are the cost and bandwidth of the primary path. The last two objectives are minimized lexicographically. In alternative embodiments: no primary paths are determined; only one or two primary paths are determined as a respective function of one or two of the three objectives; additional primary paths are determined as a function of other objectives; or more than one additional path is determined for one or more of the objectives.

For the most efficient implementation of the algorithm, the algorithm maximizes bandwidth but applies lexicographic minimization to approximately minimize cost for one source to a sub-set of k selected destinations, where k=1 to N−1. This efficient implementation provides a complexity and associated calculation time proportional to O(M log N), where M is the number of links and N is the number of nodes. O(M log N) is the same order as the running time of Dijkstra's algorithm. For primary paths, the objective $(1/b(P), c(P))$ may be minimized, without heuristic approximation, over all solutions that can be represented by the function $p(v)$, which defines a tree as described below.

The algorithm for pre-computing paths may be fast enough to complete within one PNNI update period as defined in the ATM standard, such as 100 seconds. Once every update period, each node 12 recomputes the pre-computed paths to every destination node 12.

The pre-computed paths are stored. The paths may be represented by designation of links 14 or nodes 12. For this designation, storage proportional to O(HK), where H is the maximum number of hops in a path and K is the number of selected destinations, is required.

In a preferred embodiment, a compact representation is used for storing the paths. For a given source node, three variables, $p(v)$, $r(v)$, $q(v)$, are stored for each node 12 in network 10. $p(v)$ is the parent node 12 of v (i.e., the next-to-last node on the primary path to (v). $p(v)$ for all v defines a tree within network 10 consisting of primary paths from the source node to all destinations nodes. Also, $p(v)$ defines the next-to-last node on one of the maximally disjoint paths to v. $r(v)$ is the next-to-last node on the other maximally disjoint path to v. A tree link is a link (w,v) such that w=p(v); all other links are nontree links. The link (r(v), v) is the last link on one of the maximally disjoint paths, and is either a nontree link or is common to both paths. $q(v)$ is defined such that the link (r(u), u) where u=q(v), is on one of the maximally disjoint paths, and is either a nontree link or is common to both paths. The link (r(u), u), where u=q(v), is also the last link on one of the maximally disjoint paths to u. If completely maximally disjoint paths exist to node v, then the above definitions of r(v) and q (v) become: (r(v), v) is a link 14 that is not in the tree defined by p(v) and is the last link on one of the disjoint paths to v. q(v) is such that the non-p(v) tree link (r(u), u), where u=q(v), is on one of the maximally disjoint paths to v. q (v) also defines the last link on one of the maximally disjoint paths to u. Using the variables assigned to each node 12, the primary and two maximally disjoint paths to any destination node in the network may be determined. Other representations of one or more paths may be used.

Using the compact representation discussed above, the three paths for a given destination are extracted from this representation. By extraction, nodes 12 in each path are determined. Extraction from the compact representation is performed in a period of time proportional to the total number of hops in the paths. The amount of storage required for the compact representation is O(N).

The three paths to each destination node may be extracted prior to receiving a request to transfer data. The three paths to each destination node are defined by nodes 12 in the path. In addition, network parameters associated with each path (i.e., path metrics) may be computed from link 14 and node 12 network parameters prior to receiving the request to transfer data. Prior computation of path metrics results in minimal time to determine whether a given path satisfies the user constraints for a given request.

B. One Preferred Embodiment of the Algorithm

In one preferred embodiment, at least one pair of maximally disjoint paths and a primary path are determined.

Figure 2:
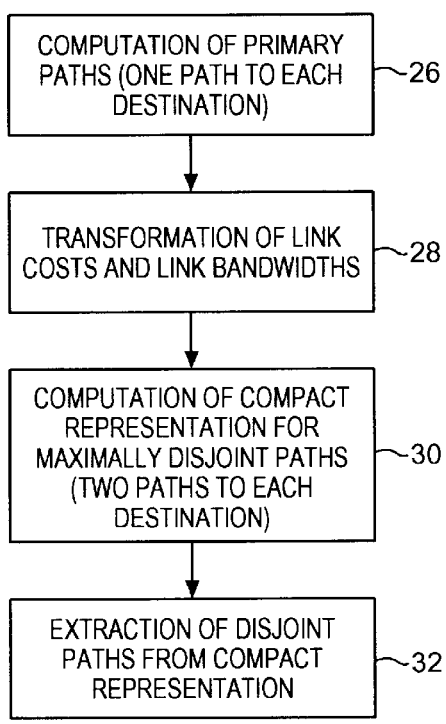
FIG. 2 is a flow chart diagram of one embodiment for determining and outputting a plurality of paths, including maximally disjoint paths, in accordance with the present invention.

Referring to FIG. 2, a flow chart diagram of one embodiment for determining and outputting a plurality of paths, including maximally disjoint paths, in accordance with the present inventions is shown. The algorithm represented by the flow chart is processed at each source node 12.

In step 26, a path is determined to each node 12, generating a tree of primary paths. The primary paths are determined from the topology of network 10 and information representing various network parameters, such as delay and bandwidth for each link 14.

In step 28, the costs metric, such as delay, and the bandwidth associated with each link 14 is transformed. The transformation provides bandwidth and cost metric data representing entire paths for step 30.

In step 30, maximally disjoint paths are determined and contained in a compact representation. The maximally disjoint paths are determined as a function of bandwidth, a cost metric or a combination thereof. In step 32, the primary and maximally disjoint paths are extracted from the compact representation.

The same process steps are performed for each of the three preferred objectives discussed above. For brevity, the second objective of the algorithm (i.e., determining paths to each destination node that lexicographically minimizes (1/b (P), c(P)) is discussed below. For determining a pair of maximally disjoint paths, (g(P1, P2), 1/b(P1, P2), c(P1, P2)) is lexicographically minimized, over all solutions having the compact representation described above.

1. Primary Path Determination

Figure 5A:
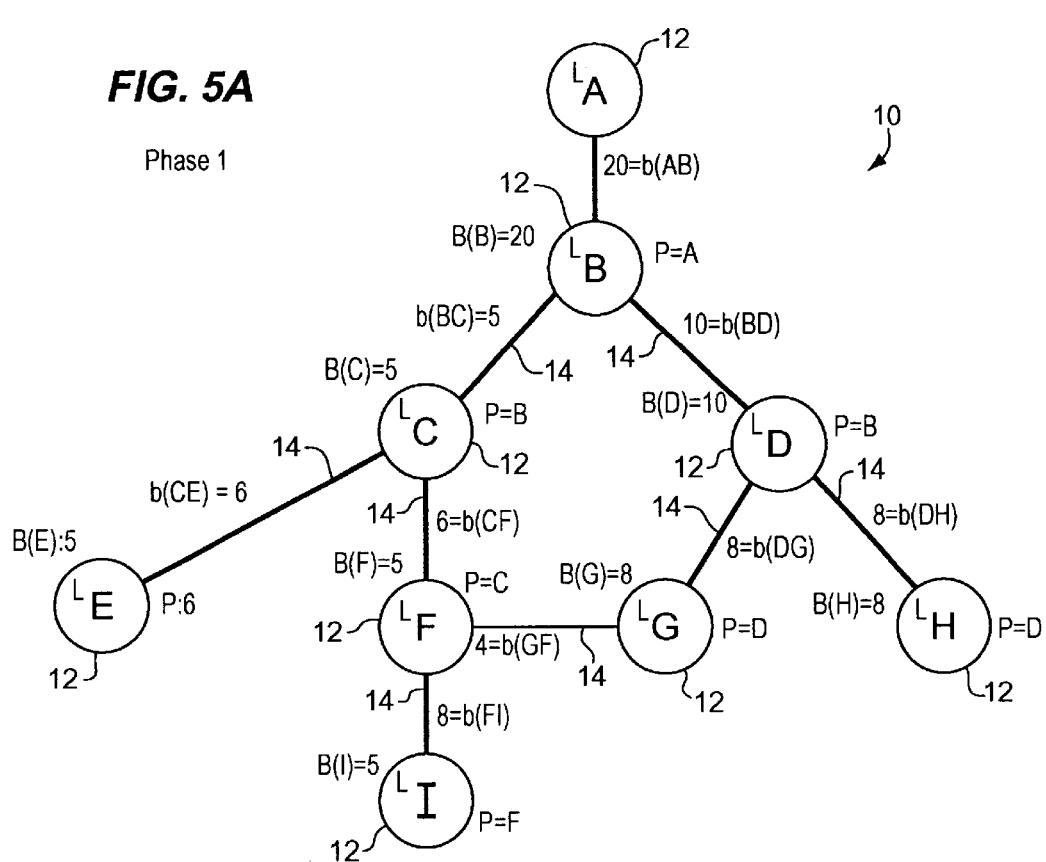
FIGS. 5A–D are schematic representations of the network of FIG. 1A labeled with calculations made for the four steps of FIG. 2, respectively, in accordance with the present invention.

To determine the primary paths discussed in step 26, a modification of Dijkstra's algorithm is used. A primary path to each destination is computed by lexicographically minimizing the objective (1/b(P), c(P)). Referring to FIG. 5A, an example schematic representation of the network 10 labeled with calculations made during step 26 of FIG. 2 is shown. For this example, Node A is the source node, s. To avoid clutter in FIGS. 5A–D, the cost metric associated with each link 14 is assumed to be equal, such as 1 and is not represented in FIGS. 5A–D.

Figure 3:
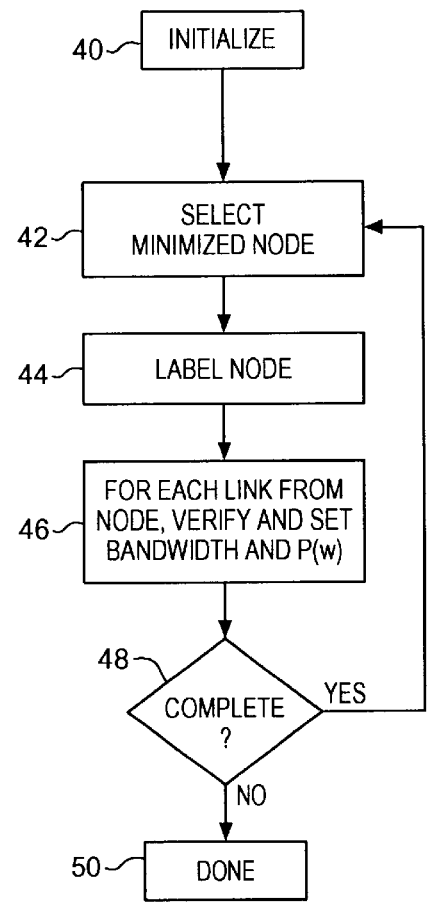
FIG. 3 is a flow chart diagram of one embodiment for determining maximum bandwidth paths in accordance with the present invention.

Referring to FIG. 3, a flow chart diagram of one embodiment for determining the second objective maximum bandwidth paths with a secondary consideration of a cost metric in accordance with the present invention is shown. For each node v, a distance d(v) to node v corresponding to the cost metric and a bandwidth B(v) to node v is maintained.

In step 40, the distance and bandwidth variables are initialized: $B(s)=\square$; $B(v)=0$ for all nodes v other than source node s; $d(s)=0$; and $d(v)=\square$ for all nodes v other than source node s. Each node 12 is marked as unlabeled.

To obtain a tree of primary paths, steps 42, 44, 46 and 48 are repeated until there is no unlabeled node v where B(v) is not zero. In step 42, an unlabeled node v is selected such that (1/B(v), d(v)) is lexicographically minimized. For example, the source node A is selected. In a preferred embodiment, a heap data structure is used to find the next node to be labeled.

In step 44, selected node v is labeled. For example, source node A is labeled.

In step 46, the next node, w, for each link 14 from selected node v is examined. The distance and the bandwidth associated with each next node w may be set. The bandwidth is set if the minimum of the bandwidth associated with the selected node v and associated with link (v, w) is (1) greater than the bandwidth associated with next node w, or (2) equal to the bandwidth associated with next node w and the distance associated with selected node v plus the cost associated with link (v, w) is less than the cost associated with next node w. The first node labeled is the source node. For example, if node B is the source node, connected nodes A, C and D are assigned bandwidths equal to the respective links BA, BC, and BD (i.e., 20, 5 and 10 respectively).

If the comparison discussed above is true, the bandwidth of next node w is set as the minimum of the bandwidth associated with selected node v and associated with link (v, w). The distance is set as the distance associated with selected node v plus the cost associated with link (v, w). Mathematically, step 46 is represented as:

For each edge (v, w), if min{B(v), b(v, w)}>B(w), or min{(B(v), b(v, w)}=B(w) and d(v)+c(v, w)<d(w), set B(w)=min{B(v), b(v, w)}, d(w)=d(v)+c(v, w), Finally, the variable p(w) is set equal to v for compactly representing the primary path.

In the example discussed above, only one link 14 from source node A exists, link AB. The bandwidth of link AB is 20. The minimum of B(A) and b(AB) is 20 where B(s)=B(A) was initialized to infinity. 20 is greater than the initialized value of B(B), zero. Therefore, B(B) is set equal to the minimum of (B(A), b(AB)), which is 20. Likewise, the cost is set.

In step 48, the network 10 is examined for any unlabeled nodes 12. In the example discussed above, only node A is labeled. Therefore, steps 42, 44, 46 and 48 are repeated.

In step 42, node B is selected as the only possibility. In step 44, node B is labeled. In step 46, 10 is greater than B(D)=0 and 5 is greater than B(C)=0, so the bandwidth at node D is set to 10 and the bandwidth at node C is set to 5. Likewise, the costs and p(B) are set. In step 48, additional unlabeled nodes v exist. Therefore, the process is repeated.

Repeating step 42, both nodes C and D are examined for lexicographic minimization. The bandwidth of node C is 5 and the bandwidth of node D is 10. Based on the lexicographic minimization 1/b, c, node D is selected regardless of the cost or distance. This process continues until no unlabeled node v with B(v) nonzero exists.

After completion of primary path determination in step 50, B(v) is the maximum bandwidth of any path to any selected destination node v, with cost considered as a secondary selection criteria. d(v) is the minimum cost of any maximum bandwidth path to v.

Referring to FIG. 5A, network 10 labeled with each link bandwidth b(v, w) and node bandwidth B(v) is shown. The variable p(v) is also shown. Based on lexicographic minimization, every link 14 but link GF is used as part of a primary path to at least one destination node v. The primary paths, represented by bold link lines, define a tree that may not include some links, such as link GF. In the example, link GF is associated with a low bandwidth (e.g., b(G,F)=4).

2. Transforming Link Bandwidths

Figure 5B:
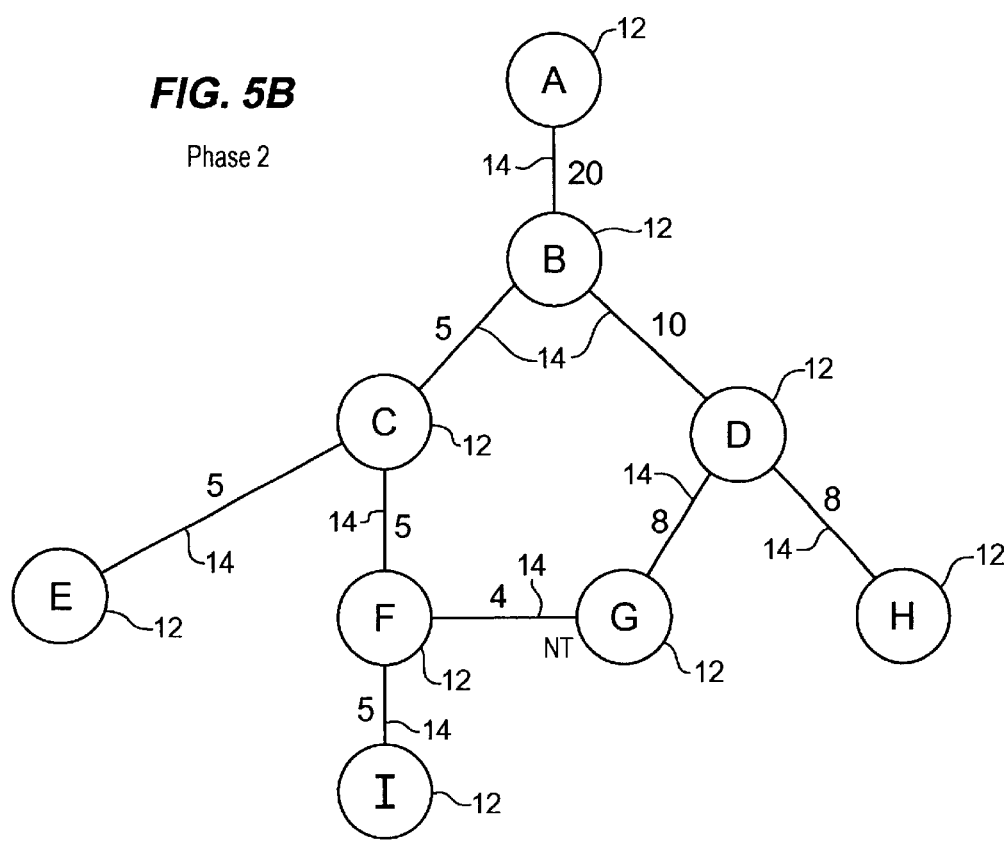

Referring to FIGS. 2 and 5B, the bandwidth and cost associated with each link 14 is transformed in step 28. The transform accounts for link and node bandwidths along the path from source node s. The transformed bandwidth for each link 14 is set to the minimum of the bandwidth of the originating node of each link 14 and the link bandwidth. The transform of the bandwidth and cost of each link (v, w) is represented as follows:

$$b'(v, w)=\min\{B(v), b(v, w)\} \quad c'(v, w)=c(v, w)-d(w)+d(v).$$

For example, the bandwidth of link CF is 6 in FIG. 5A. This bandwidth is transformed to 5, the minimum of B(C)=5 and b(C,F)=6. FIG. 5B demonstrates the transformed bandwidths of FIG. 5A.

Recognition of characteristics of the transform step may provide more efficient implementation by avoiding unnecessary computations. The bandwidth of any path from source node s does not change since B(v) is the maximum bandwidth of any path to v. b'(v, w)=B(w) for any link (v, w) in the primary path tree since B(w)=min{(B(v), b(v, w)}. Therefore, b'(v, w)☐B(w) for all links 14. Transformation does not effect the relative cost of paths to a given node v, since d(v) is subtracted from the cost of each such path. Finally, c'(v, w)=0 for any link (v, w) in the primary path tree.

3. Determination of Maximally Disjoint Paths

Figure 5C:
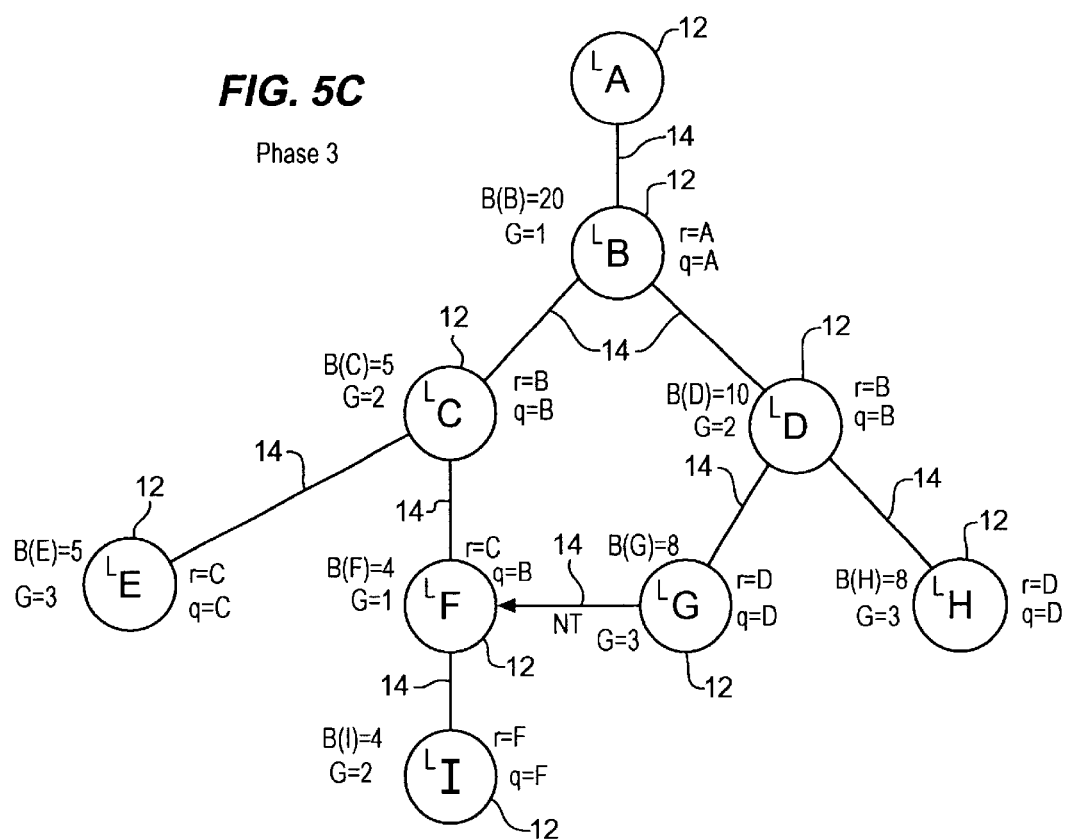

To determine the pair of maximally disjoint paths in one preferred embodiment, lexicographic minimization is used. Referring to FIG. 5C, an example schematic representation of the network 10 labeled with calculations performed for step 30 of FIG. 2 is shown.

Figure 4:
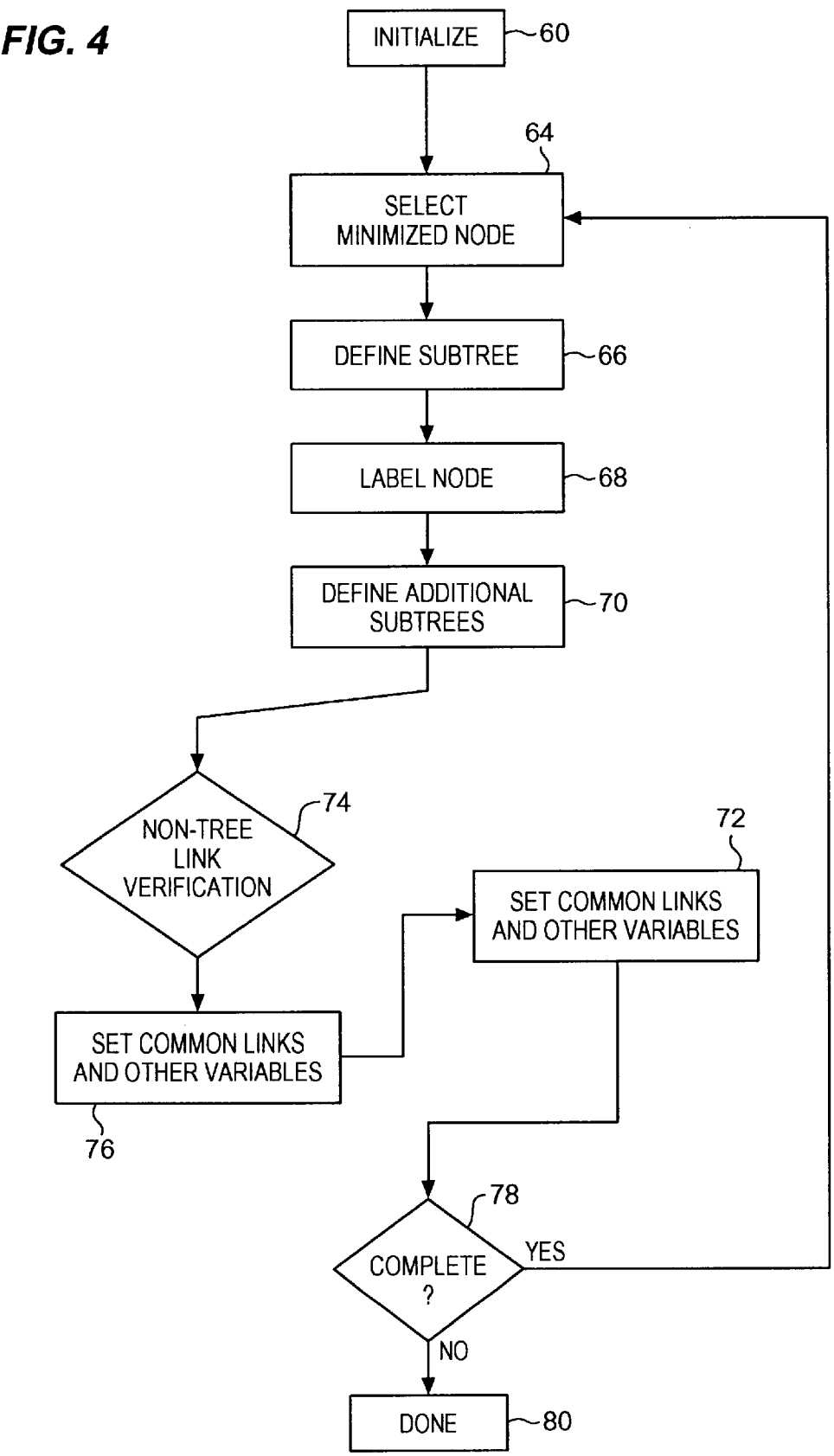
FIG. 4 is a flow chart diagram of one embodiment for determining maximally disjoint paths in accordance with the present invention.

Referring to FIG. 4, a flow chart diagram of one embodiment for determining maximally disjoint paths as a function of bandwidth with cost as a secondary criteria for step 30 of FIG. 2 is shown. For each node 12, the following variables are maintained: r(v), q(v), d'(v), G(v), and B'(v) for a given source node s. G(v) represents the number of common links between two maximally disjoint paths from node s to node v. B'(v) represents the minimum bandwidth of the two maximally disjoint paths to v using the transformed link bandwidths. d'(v) represents the total cost of the two maximally disjoint paths using the transformed link costs c'(i, j). r(v) and q(v) represent two nodes used for compact representation.

In step 60, the number of common links, the bandwidth and distance variables are initialized for every node 12. G(s)=0; G(v)=☐ for all nodes v other than source node s; B'(s)=☐; B'(v)=0 for all nodes v other than source node s; d(s)=0; d(v)=☐ for all nodes v other than source node s. r(v) and q(v) are undefined for every node v. Each node 12 is also marked as unlabeled.

To determine the maximally disjoint paths, steps 64, 66, 68, 70, 72, 74, 76 and 78 are repeated until there is no unlabeled node v where G(v) is finite. In step 64, an unlabeled node v is selected such that (G(v), 1/B'(v), d(v)) is lexicographically minimized. For example, source node A is selected. In a preferred embodiment, a heap search is used to find the next node to be labeled.

In step 66, a sub-tree, S, is defined. The sub-tree is defined as a function of connected, unlabeled nodes 12. The sub-tree contains v and any connected unlabeled nodes 12 in the primary path tree. For example, the sub-tree initially contains nodes A, B, C, D, E, F, G, H, and I. (e.g. all nodes).

In step 68, the selected node v is labeled. For example, node A is labeled.

In step 70, additional sub-trees are defined as a function of labeling step 68. S is split into additional unlabeled sub-trees, $S_n$. One additional sub-tree is defined for the parent p(v) of node v, if it exists and is unlabeled, and an additional sub-tree is defined for each unlabeled child of node v. For example, no p(v) exists for source node A, and only one child node 12 exists, node B. The additional subtree, $S_1$, comprises nodes B and C–I.

The process for determining maximally disjoint paths performs two processes after step 70. In one process, links 14 associated with the tree are processed. In another process, links 14 not associated with the tree are processed. These processes may be performed in any order. In one preferred embodiment, steps 74 and 76 are performed first, and step 72 is performed second.

In step 74, non-tree links are selected for processing in step 76. For links 14 not associated with the tree (non-tree links), the associated node 12 is verified using the sub-tree S and the additional sub-trees in step 74. Each non-tree link is defined by two nodes (u, w). The non-tree link (u, w) is verified if u and w are in subtree S and either u=v or u and w are in different additional sub-trees $S_n$. For example, link GF is the only non-tree link of network 10. G and F are in S, but (1) G is not A and (2) G and F are in the same additional sub-tree, $S_1$. Therefore, the non-tree link is not verified and this process continues at step 72.

In one embodiment, a method for efficiently determining which non-tree links to process when a node is labeled is used. (See, for example, Suurballe and Tarjan (1984), "A Quick Method For Finding Shortest Pairs of disjoint Paths," Networks, Vol. 14, pp. 331–32). This method involves maintaining a double linked list, for each node v, of the unprocessed non-tree links both entering and leaving node v. Each list sorts the edges in non-decreasing order using the preorder number of the end of each link that is not node v. The lists are initialized using radix sorting. Other methods may be used, such as traversing, one at a time, the nodes in a unlabeled subtree formed by labeling v and processing all the non-tree edges incident to the node. The unlabeled subtree containing the parent of v (if it exists and is not labeled) is traversed. Then, one at a time, each unlabeled subtree containing an unlabeled child of v is traversed.

In step 76, each verified non-tree link (u,w) is processed, and various variables associated with each such node w may be set. Step 76 is repeated for any verified non-tree link (u,w). The variables are set (1) if the number of common links associated with the selected node v, G(v), is less than the number of common links associated with the node w, G(w); (2) if G(v)=G(w) and the inverse of the minimum of the bandwidth associated with the selected node v and the inverse of the bandwidth associated with the verified non-tree link (u, w), 1/min{B'(v), b'(u, w)}, is less than the bandwidth associated with the destination node w, 1/B'(w), of the non-tree link (u, w); or (3) if G(v)=G(w), 1/min{B'(v), b'(u, w)}=1/B'(w) and the distance associated with the selected node v plus the cost associated with the non-tree link (u, w), c'(u, w) is less the distance associated with the destination node w, d'(w) of the non-tree link (u, w). Mathematically, this comparison is represented as:

if (G(v), 1/min{B'(v), b'(u, w)}, d'(v)+c'(u, w))<(G(w), 1/B'(w), d'(w))

For example, G(B) is 1. G(F) of non-tree link GF is ∞. G(B) is less than G(F).

The bandwidth, the distance, the number of common links and compact representation variables for node w are set if the comparison is true. The number of common links G(w) is set to the number of common links for selected node v, G(v). The bandwidth B'(w) is set to the minimum of the bandwidth associated with the selected node v and the bandwidth associated with the non-tree link (u, w), min{B'(v), b'(u, w)}. The distance d'(w) is set to the distance associated with the selected node v plus the cost associated with the non-tree link (u, w), d'(v)+c'(u, w). Compact representation variable r(w) is set equal to source node u of the non-tree link (u, w). Compact representation variable q(w) is set equal to v. Mathematically, setting the variables is represented as:

then set G(w)=G(v), B'(w)=min{B'(v), b'(u, w)}, d'(w)=d'(v)+c'(u, w), r(w)=u, and q(w)=v For links 14 associated with the tree, various variables associated with each next node w such that p(w)=v may be set in step 72 for each unlabeled next node w. The variables are set (1) if the number of common links associated with the selected node v plus 1, G(v)+1, is less than the number of common links associated with the next node w, G(w); or (2) if G(v)+1=G(w) and the functions discussed in step 46 of FIG. 3 are true. Mathematically, this comparison is represented as:

if $(G(v)+1, 1/\min\{B'(v), b'(v,w)\}, d'(v)+c'(v,w))<(G(w), 1/B'(w), d'(w))$

For example, G(A)+1 is 1. 1 is less than G(B), ∞.

If the comparison is true, the bandwidth, the distance, the number of common links and compact representation variables are set for each next node w in which the comparison discussed above is true. The number of common links G(w) is set to the number of common links for the selected node, G(v), plus 1. The bandwidth B'(w) is set to the minimum of the bandwidth associated with selected node v and the bandwidth associated with the link (v, w). The distance d'(w) is set to the distance associated with selected node v. Compact representation variable r(w) is set equal to v, which is equal to p(w). Compact representation variable q(w) is also set equal to v. Mathematically, setting the variables is represented as:

then set $G(w)=G(v)+1$, $B'(w)=\min\{B'(v), b'(v,w)\}$, $d'(w)=d'(v)$, $r(w)=v(=p(w))$, and $q(w)=v$.

For example, G(B) is set to 1 and B'(B) is set to 20. Likewise, the distance is set. r(B) is set to A, and q(B) is set to A.

In step 78, the network 10 is examined for any unlabeled nodes 12 where G(v) is finite. In the example above, only node A is labeled. If unlabeled nodes 12 exist where G(v) is finite, and if not all K selected destinations are labeled, the process returns to step 64. Otherwise, the process is complete.

Continuing the example discussed above, node B is selected in step 64. G(B)=1 and all other unlabeled G(v) are infinite. The sub-tree, S, is defined as B–I in step 66. In step 68, node B is labeled. In step 70, two additional sub-trees are defined as a function of labeling node B. One additional sub-tree, $S_1$, comprises nodes C, E, F and I. The second additional sub-tree, $S_2$, comprises nodes D, G and H.

In step 74, the non-tree link GF is verified. Nodes G and F are in sub-tree S, and G and F are in different additional sub-trees $S_1$ and $S_2$ respectively. Therefore, the process continues to step 76.

In the example above, step 76 is then performed. For example, G(F) is set to 1, and B'(F) is set to 4. Likewise, the distance is set. r(F) is set to G, and q(F) is set to B. Step 76 is repeated for any verified non-tree (u,w).

Nodes 12 in the primary path tree connected to selected node v are processed in step 72. Two nodes C and D connect to selected node B. G(B) is equal to 1, and G(C) is equal to □. 1 is less than □. Therefore, G(C) is set to 2; B'(C) is set equal to 5; the distance is set; r(C) is set to B; and q(C) is set to B. G(D) is equal to □. G(B) is less than □. Therefore, G(D) is set equal to 2; B'(D) is set equal to 10; the distance is set; r(D) is set to B; and q(D) is set to B.

In step 80, determination of maximally disjoint paths to each destination node 12 is complete (i.e., the process of steps 64, 66, 68, 70,72, 74, 76 and 78 is repeated until there is no unlabeled node 12 with G(v) finite). Referring to FIG. 5C, network 10 labeled with G(v), B'(v), r(v) and q(v) is shown. The labels represent these variables after the process is complete.

The example above for FIGS. 5A–C demonstrates determination of a primary path and maximally disjoint paths for one objective, (1/b, c). The objective (c) may be obtained by setting b(i, j) to be the same constant for all links 14 in the example discussed above. The objective (min{b(i, j), Θ}) may be obtained by replacing b(i, j) with min{(i, j), Θ} for all links 14. Other objectives may be used.

This algorithm may be extended to networks having parallel links by employing the transformation presented in Suurballe and Tarjan, "A Quick Method for Finding Shortest Pairs of Disjoint Paths," Networks, Vol. 14, pp. 325–336, at 334 (1984). The variables p(v) and r(v) are redefined as links entering v rather than as vertices adjoining v.

4. Extraction of Paths

Figure 5D:
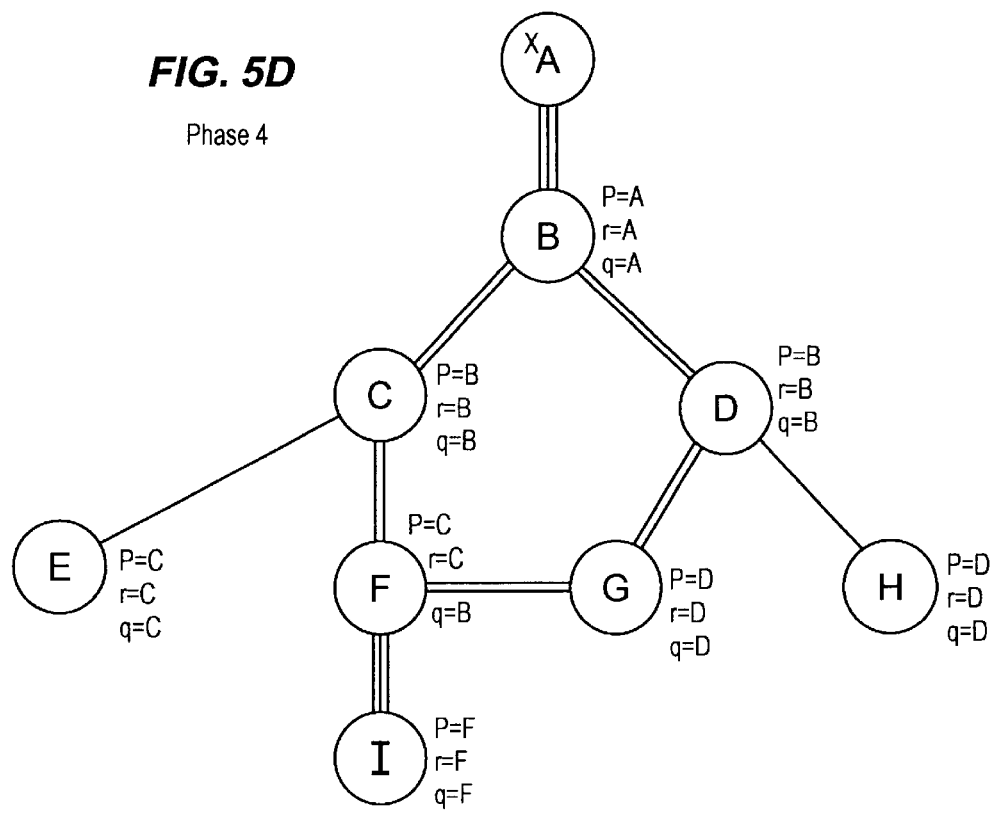

Referring to FIG. 5D, a schematic representations of network 10 labeled with the compact representation variables for node A as source node s is shown. Given the variables p(w), r(w), and q(w) for each node w, the primary path and the pair of maximally disjoint paths from the source node s to any one destination node v is extracted. Certain nodes 12 are marked in an initialization step, and then each path is constructed by traversing network 10 from destination node v to source node s. For example, node A is the source node s, and node I is the destination node v.

First, all nodes 12 are unmarked and a variable x is set to v. For example, nodes A–I are labeled as unmarked, and x is set to node I.

Second, x is marked and then replaced by q(x). This marking and replacing step is repeated until x=s. For example, node I is labeled as marked, and x is set to node F. Node F is labeled as marked, and x is set to node B. Node B is labeled as marked, and x is set to node A, the source node s. Therefore, nodes B, F and I are marked.

Third, x is set to destination node I, and the following two steps are repeated until x is set to source node A. If x is labeled as marked, the label for node x is set to unmarked, the link (r(x), x) is added to the front of the path, and x is replaced by r(x). If x is labeled as unmarked, the link (p(x), x) is added to the front of the path, and x is replaced by p(x).

For example, node I is marked, so I is unmarked, and x is replaced by r(I)=F. Again, since node F is marked, F is unmarked, and x is replaced by r(F)=G. Since node G is unmarked, x is replaced by p(G)=D. Similarly, since node D is unmarked, x is replaced by p(D)=B. Finally, since node B is marked, B is unmarked, and x is replaced by r(B)=A. This yields the first path (A B D G F I).

Fourth, to extract the second maximally disjoint path, x is set to destination node I. The third step is repeated until x is set to the source node. For example, node I is labeled as unmarked, so x is replaced with p(I), node F, then replaced with node C, then node B and then node A. Therefore, the second maximally disjoint path is extracted as nodes A, B, C, F and I.

The primary path is extracted by setting x to the destination node I and replacing x with p(x) until x is set to source node A. The primary path is determined without regard to the marked or unmarked label. For the example discussed above, the second maximally disjoint path is the same as the primary path, nodes A, B, C, F and I. Other compact representations may be used. In alternative embodiments, the pre-computed paths are defined without compact representation.

C. Use of Pre-computed Paths

In response to a request for the transfer of data, the source node 12 either selects one of the pre-computed paths or determines that none of the pre-computed paths is acceptable. To select a pre-computed path, network parameters associated with the pre-computed path, such as delay, jitter and minimum bandwidth, are compared to the set of path constraints provided with the request to transfer data. If the network parameters associated with one of the pre-computed paths satisfies the constraints, the pre-computed path is selected. The selected pre-computed path must also avoid any link 14 or node 12 that has previously blocked the request to transfer (e.g., if a set-up has already been attempted for the request).

To most efficiently compare network parameters associated with the pre-computed paths to the constraints, the pre-computed paths are ordered for comparison. The first pre-computed path satisfying the constraints is selected. A route selection policy is used to determine the order in which to compare the pre-computed paths. Objectives for the route selection policy may include maximizing revenue or throughput, achieving fair call blocking, load balancing, or other objectives.

In a first route selection policy, the pre-computed paths are arranged to minimize or maximize one of the network parameters associated with the pre-computed paths. One example of this route selection policy is to order the pre-computed path according to hop count. This route selection policy may provide minimum use of network resources. Another example is to order the pre-computed paths as a function of the minimum bandwidth. This route selection policy may save pre-computed paths associated with a larger bandwidth for requests to transfer that require larger bandwidth. Alternatively, the pre-computed paths are ordered as a function of maximum bandwidth to optimize load balancing.

In a second route selection policy, the first route selection policy is used, but primary paths are compared first. If none of the pre-computed primary paths satisfy the constraints, the maximally disjoint paths are compared to the constraints. In one preferred embodiment, this second route selection policy is used if the maximally disjoint paths are not extracted prior to receiving the request to transfer data, since the network parameters associated with a pre-computed path are not known until extracted. In alternative embodiments, the network parameters associated with a path are known prior to extraction.

In a third route selection policy, pre-computed paths are randomly selected from among all paths satisfying the constraints. Random selection may provide a more even distribution of traffic and may reduce the probability of multiple sources trying to simultaneously use the same link 14.

In a fourth route selection policy, thresholds are applied to the pre-computed paths. For example, $B_h$ denotes a high bandwidth, or $D_1$ denotes a small delay. If the bandwidth constraint of the request is above $B_h$, a set of pre-computed paths determined as a function of maximize bandwidth is selected for comparison with the constraints (i.e., paths determined from the second objective for path determination). If the delay constraint of the request is below $D_1$, a set of pre-computed paths determined as a function of minimum delay is selected for comparison with the constraints (i.e., paths determined from the first objective for path determination). For some combinations of bandwidth and delay constraints, the route selection policy begins by comparing a set of paths determined as a function of a tradeoff between delay and bandwidth (ie., paths determined from the third objective for path determination). Other rules are possible, including rules that include more than one delay threshold and more than one bandwidth threshold.

In alternative embodiments, different route selection policies are implemented. In yet other alternative embodiments, a request to transfer is rejected even if a pre-computed path that satisfies the constraints is found. Rejection may fulfill other objectives, such as increasing the expected revenue or throughput by saving resources for future calls. In another embodiment, the algorithm computes paths from multiple sources to a single destination. This embodiment reverses the roles of sources and destinations and reverses the direction of each link in the graph.

The maximally disjoint paths can also be used in other ways. For example, one of the paths can be used initially, and another used as an alternate path if the initial path fails. Also, two maximally disjoint paths from a source to a destination can be used simultaneously, where different data are sent over the different paths to reduce the amount of data each path must carry, or where the same information is sent over both paths for improved reliability.

IV. Further Alternative Considerations

As discussed above, various alternative implementations for determining and using maximally disjoint paths are possible. In one embodiment, various functions of the algorithm are selectable by a network administrator. The network administrator may determine the best implementation given the network topology and the type of traffic or data most often transmitted in the network. For example, several parameters determine how maximally disjoint paths are determined, such as: the number of network parameters to include in the cost functions c(i, j); which network parameters to use in the cost functions c(i, j); the relationship between cost metrics for cost functions c(i, j); the number and type of objective functions to use for each cost function; whether to compute maximally disjoint paths, primary paths or both for a given objective; how often to update the pre-computed paths; and whether to extract the disjoint paths prior to processing a new request. Other parameters may be selectable. The adjustment may be dynamic and depend on which request constraints are most often are or are not satisfied by the pre-computed paths.

In other alternative embodiments, links 14 that do not satisfy one or more network parameters, such as cell loss ratio constraints, are removed from the network topology before determining pre-computed paths. Alternatively, these links 14 are removed before determining only a sub-set of the pre-computed paths.

The examples described above correspond to determining link 14 based maximally disjoint paths as a function of the number of common links 14. In alternative embodiments, maximally disjoint paths are determined as a function of a number of common nodes 12. An algorithm for transforming a link based algorithm to a node based algorithm is provided by Suurballe and Tarjan, "a Quick Method For Finding Shortest Pairs of Disjoint Paths," *Networks*, Vol. 14, pp. 325–36, at 334 and 335 (1984). In yet other alternative embodiments maximally disjoint paths are determined as a function of the number of common nodes 12 and links 14.

It should be understood that many changes and modifications can be made to the embodiments described above. For example, different methods for determining and representing maximally disjoint paths may be used. It is therefore intended that the foregoing detailed description be understood as an illustration of the presently preferred embodiments of the invention, and not as a definition of the invention. It is only the following claims, including all equivalents, that are intended to define the scope of the invention.

We claim:

1. A method of determining a plurality of paths in a network, the method comprising:

determining a set of paths between a source node and a destination node;

determining disjointness between pairs of paths of the set of paths; and determining at least first and second maximally disjoint paths from the set of paths based on disjointness and cost, on disjointness and bandwidth, or on a combination of disjointness, cost, and bandwidth.

2. The method of claim 1, wherein determining the at least first and second maximally disjoint paths further comprises randomly selecting the at least first and second maximally disjoint paths from among all disjoint paths above a predetermined disjointness threshold.

3. The method of claim 1, further comprising determining the at least first and second maximally disjoint paths as a function of network service categories.

4. The method of claim 1, wherein the first maximally disjoint path comprises a primary path.

5. The method of claim 1, wherein computing the set of paths comprises pre-computing the set of paths.

6. The method of claim 1, further comprising excluding a blocked communication path or a blocked communication node from the set of paths.

7. The method of claim 1, with the ordering father comprising grouping the paths in the set of paths according to Quality of Service (QoS) classifications.

8. The method of claim 1, further comprising ordering the set of paths according to a route selection policy before determining the at least first and second maximally disjoint paths.

9. The method of claim 8, wherein the route selection policy orders the set of paths based on a hop count.

10. The method of claim 8, wherein the route selection policy orders the set of paths based on a minimum required bandwidth.

11. The method of claim 8, wherein the route selection policy orders the set of paths based on a maximum available bandwidth.

12. The method of claim 8, wherein the route selection policy orders the set of paths based on path jitter.

13. The method of claim 8, wherein the route selection policy orders the set of paths based on path delay.

14. The method of claim 8, wherein the route selection policy orders the set of paths to maximize throughput.

15. The method of claim 8, wherein the route selection policy orders the set of paths to achieve fair call blocking.

16. The method of claim 8, wherein the route selection policy orders the set of paths to achieve load balancing.

17. The method of claim 8, wherein the route selection policy orders the set of paths to maximize carrier revenue.

18. The method of claim 8, wherein the route selection policy orders primary paths before ordering non-primary paths and wherein the first maximally disjoint path comprises a primary path.

19. A method of determining a plurality of paths in a network, the method comprising:

determining a set of paths between a source node and a destination node;

ordering the set of paths according to a route selection policy to form a set of ordered paths;

determining disjointness between pairs of paths of the set of ordered paths; and determining at least first and second maximally disjoint paths from the set of ordered paths based on the ordering and the disjointness with determining at least first and second maximally disjoint paths further comprising determining the at least and second maximally disjoint paths in order to primarily maximize bandwidth while secondarily minimizing cost.

20. The method of claim 19, wherein the route selection policy orders the set of paths based on a hop count.

21. The method of claim 19, wherein the route selection policy orders the set of paths based on a minimum required bandwidth.

22. The method of claim 19, wherein the route selection policy orders the set of paths based on a maximum available bandwidth.

23. The method of claim 19, wherein the route selection policy orders the set of paths based on path jitter.

24. The method of claim 19, wherein the route selection policy orders the set of paths based on path delay.

25. The method of claim 19, wherein the route selection policy orders the set of paths to maximize throughput.

26. The method of claim 19, wherein the route selection policy orders the set of paths to achieve fair call blocking.

27. The method of claim 19, wherein the route selection policy orders the set of paths in order to achieve load balancing.

28. The method of claim 19, wherein the route selection policy orders the set of paths in order to maximize carrier revenue.

29. The method of claim 19, wherein the route selection policy orders primary paths before ordering non-primary paths and wherein the first maximally disjoint path comprises a primary path.

30. The method of claim 19, wherein determining the at least first and second maximally disjoint paths further comprises randomly selecting the at least first and second maximally disjoint paths from among all disjoint paths above a predetermined disjointness threshold.

31. The method of claim 19, further comprising determining the at least first and second maximally disjoint paths in order to minimize cost.

32. The method of claim 19, further comprising determining the at least first and second maximally disjoint paths in order to maximize available bandwidth.

33. The method of claim 19, further comprising determining the at least first and second maximally disjoint paths in order to maximize bandwidth and minimize cost.

34. The method of claim 19, further comprising determining the at least first and second maximally disjoint paths as a function of network service categories.

35. The method of claim 19, wherein the first maximally disjoint path comprises a primary path.

36. The method of claim 19, wherein computing the set of paths comprises pre-computing the set of paths.

37. The method of claim 19, further comprising excluding a blocked communication path or a blocked communication node from the set of paths.

38. The method of claim 19, with the ordering further comprising grouping the paths in the set of paths according to Quality of Service (QoS) classifications.

* * * * *

UNITED STATES PATENT AND TRADEMARK OFFICE
CERTIFICATE OF CORRECTION

PATENT NO. : 6,804,199 B1
DATED : October 12, 2004
INVENTOR(S) : Timothy Gene Kelly et al.

It is certified that error appears in the above-identified patent and that said Letters Patent is hereby corrected as shown below:

Title page,
Item [75], Inventors, "Timothy Gene Kelly" is misspelled. The correct spelling is
-- Timothy Gene Kelley --.

Signed and Sealed this

Twenty-first Day of December, 2004

JON W. DUDAS
*Director of the United States Patent and Trademark Office*